R. COLEMAN.
FISH STRINGING DEVICE.
APPLICATION FILED AUG. 10, 1908.
928,427.
Patented July 20, 1909.
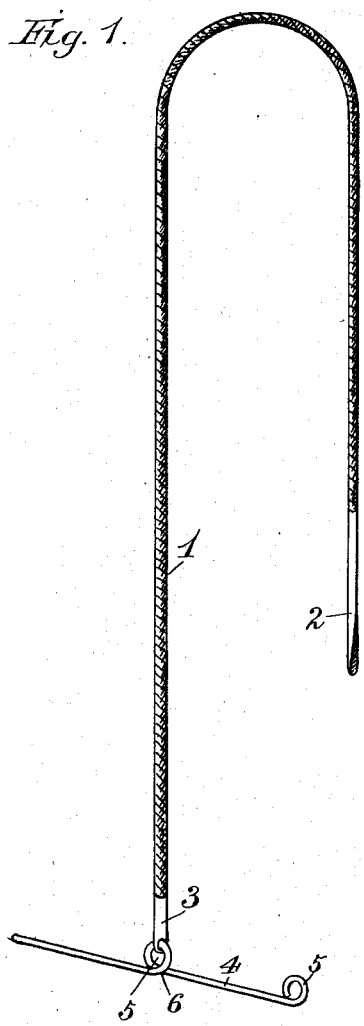
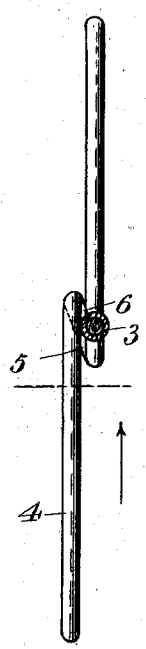
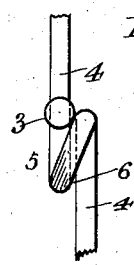
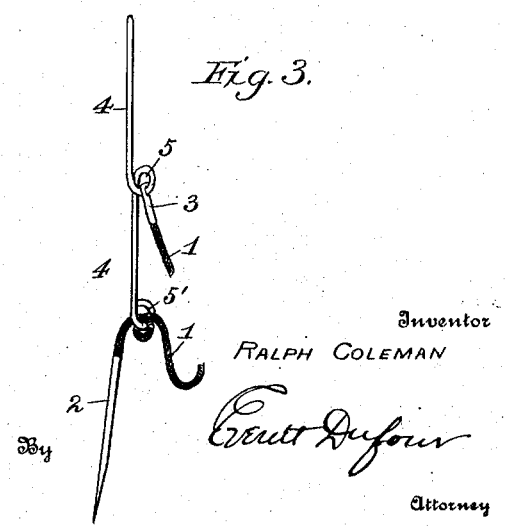
Inventor
RALPH COLEMAN

UNITED STATES PATENT OFFICE.

RALPH COLEMAN, OF HERNDON, VIRGINIA.

FISH-STRINGING DEVICE.

No. 928,427.  Specification of Letters Patent.  Patented July 20, 1909.

Application filed August 10, 1908. Serial No. 447,817.

*To all whom it may concern:*

Be it known that I, RALPH COLEMAN, citizen of the United States, residing at Herndon, in the county of Fairfax and State of Virginia, have invented certain new and useful Improvements in Fish-Stringing Devices, of which the following is a specification.

My invention pertains to improvements in what may be termed devices designed for "stringing" and carrying or transporting fish more especially in bunches.

Said invention has for its object to carry out the aforesaid purposes in a convenient, expeditious and effective manner; also to provide for the ready "stringing" of the fish, as well as for the removal of the fish with facility and expedition and for removing or unstringing the same from the bottom end of its suspending means or string; also to provide for the retention of the fish in "bunched" position without forming the suspending string or means into a loop or bringing its ends together specially for that purpose.

Said invention consists of certain features or instrumentalities substantially as hereinafter fully disclosed and defined by the claims.

In the accompanying drawing illustrating the preferred embodiment of my invention—Figure 1 is a perspective view thereof, as when "stringing" the fish. Fig. 2 is a plan view of the same, with the parts as initially adjusted when separating them as in removing the fish from the "bunching" or suspending means. Fig. 3 is a perspective view of the device, with the otherwise free or "threading" end of the string secured to the bottom retaining member. Fig. 4, is a detail end view, partly in section, of the device, the cross-bar stop-member being inverted, as when passing the eye-ended portion of the tubular or socket member between the crossing portions of the loop of said stop-member. Fig. 5 is also a detail view thereof, viewing the same parts from below upwardly.

In carrying out my invention, I employ a suitable suspending means, preferably a string or twine 1 for carrying or upon which to "bunch" the fish, and to one end of said string or twine is suitably attached a needle 2 or like instrument, for "threading" the fish thereon, and to the opposite end of said string or twine is suitably secured a metal eye member 3, preferably cylindrical in outline, with its eye formed of an opening extending transversely therethrough, near one end.

The connections between the string or twine 1 and the needle 2 and the eye-member 3 are effected by securing the respective ends of said twine in sockets formed in the line of the axis thereof and opening out through the inner ends of said needle and eye-members. I also employ a cross bar or retaining member 4, which is of such cross-section as to allow it to be passed through the eye of the member 3 as in effecting connection therewith. Said retaining member has formed about centrally thereof a loop 5 to provide for moving or disposing the eye-member 3 thereon out of the line of the axis of said retaining member, said member having its oppositely extending portions sufficiently spaced apart, as at 6, to allow the passage between the same of that portion or thickness of the eye-member 3 standing laterally beyond a cross-section of the retaining member, such passage however, being permitted only when the eye-member has been manually moved into an inverted position or oppositely to the loop, to provide against the accidental detachment of said eye-member from said retaining member when in normal or effective position, as when "stringing" or "bunching" the fish, or carrying the same. The retaining member or bar 4 has also at one end an eye 5 for looping therethrough the suspending or carrying string or twine, at its needle-equipped end, as a convenient means of disposing the latter out of the way after "bunching" the fish.

It will be noted that, in order to effect the removal of the fish, presumably "strung" or "bunched" upon the string or twine, it is only required that the eye-equipped member 3 be manipulated as aforesaid, thereby disengaging it from its previously interlocked connection or engagement with the loop 5 of the retaining cross bar 4, and allowing the fish to readily fall off the string or twine at that end by their own weight. The eye-member 3 and the retaining member 4 may again be quickly reëngaged, by suitably manipulating these parts in an obvious manner as will be readily appreciated. The device is exceedingly simple, inexpensive and effective in action and dispenses with the use of springs and such like, in addition to obviating the bringing together and uniting the ends of the fish suspending or stringing means as practiced in the use of the ordinary "splints" or other similar contrivance for the like purpose.

I claim—

1. A device of the character described, comprising a stringing member, and a cross-bar stop-member having a centrally formed loop, with its opposed crossing portions laterally spaced apart forming the entrance opening to said loop, said stringing member having attached thereto at one end an eye-ended socket, the eye-portion of said socket having a cross-sectionally reduced lateral edge adapted to just pass through said entrance-opening as said socket-equipped end of said stringing member is moved to detach said cross-bar stop-member from said stringing member.

2. A fish-stringing device, comprising a stringing member, a cross-bar stop-member and a tubular member receiving thereinto said stringing member in the direction of its length and clamped thereto and having an eye at one end, said cross-bar stop-member having a central loop with its crossing portions spaced off from each other, and said tubular member having its eye adapted to receive said cross-bar stop-member and itself slid upon the latter and between the crossing portions of the loop thereof, the loop-forming portion of said stop-member being finally received by said eye of said tubular member making effective connection therebetween.

In testimony whereof I affix my signature, in presence of two witnesses.

RALPH COLEMAN.

Witnesses:
JOHN M. FINN,
H. O. THOMPSON.